United States Patent
Brúck et al.

(10) Patent No.: US 9,893,505 B2
(45) Date of Patent: Feb. 13, 2018

(54) CONFIGURATION FOR A POWER SUPPLY OF A COMPONENT IN AN EXHAUST GAS SYSTEM

(71) Applicant: EMITEC GESELLSCHAFT FUER EMISSIONSTECHNOLOGIE MBH, Lohmar (DE)

(72) Inventors: Rolf Brúck, Bergisch Gladbach (DE); Jan Hodgson, Troisdorf (DE); Christian Vorsmann, Koeln (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/833,648

(22) Filed: Mar. 15, 2013

(65) Prior Publication Data

US 2013/0199838 A1 Aug. 8, 2013

Related U.S. Application Data

(63) Continuation of application No. PCT/EP2011/065903, filed on Sep. 14, 2011.

(30) Foreign Application Priority Data

Sep. 15, 2010 (DE) .......................... 10 2010 045 507

(51) Int. Cl.
*F01N 3/00* (2006.01)
*F01N 3/01* (2006.01)
(Continued)

(52) U.S. Cl.
CPC ................. *H02G 3/22* (2013.01); *B03C 3/06* (2013.01); *B03C 3/12* (2013.01); *B03C 3/41* (2013.01); *B03C 3/49* (2013.01); *B03C 3/66* (2013.01); *B03C 3/70* (2013.01); *F01N 3/01* (2013.01); *F01N 3/0231* (2013.01); *F01N 13/16* (2013.01); *B03C 2201/06* (2013.01);
(Continued)

(58) Field of Classification Search
USPC ...... 60/286, 295, 297, 311; 55/282.2, 282.3; 95/283
See application file for complete search history.

(56) References Cited

U.S. PATENT DOCUMENTS 2,898,217 A * 8/1959 Selsing .................. C04B 33/26
501/144
4,505,107 A 3/1985 Yamaguchi et al.
(Continued)

FOREIGN PATENT DOCUMENTS

AT 506141 A1 6/2009
CN 101053772 A 10/2007
(Continued)

OTHER PUBLICATIONS

International Search Report of PCT/EP2011/065903.

*Primary Examiner* — Mark Laurenzi
*Assistant Examiner* — Dapinder Singh
(74) *Attorney, Agent, or Firm* — Laurence A. Greenberg; Werner H. Stemer; Ralph E. Locher

(57) ABSTRACT

A configuration for a power supply of a component in an exhaust gas system includes at least one electrical contact disposed at an exhaust gas line. The at least one electrical contact is surrounded by an electrical insulation material.

6 Claims, 3 Drawing Sheets

(51) Int. Cl.
| | | |
|---|---|---|
| *F01N 3/02* | (2006.01) | |
| *F01N 3/10* | (2006.01) | |
| *F01N 3/20* | (2006.01) | |
| *H02G 3/22* | (2006.01) | |
| *F01N 3/023* | (2006.01) | |
| *F01N 13/16* | (2010.01) | |
| *B03C 3/70* | (2006.01) | |
| *B03C 3/06* | (2006.01) | |
| *B03C 3/12* | (2006.01) | |
| *B03C 3/41* | (2006.01) | |
| *B03C 3/49* | (2006.01) | |
| *B03C 3/66* | (2006.01) | |
| *F01N 3/021* | (2006.01) | |

(52) U.S. Cl.
CPC ...... *B03C 2201/10* (2013.01); *B03C 2201/30* (2013.01); *F01N 3/021* (2013.01); *F01N 3/2013* (2013.01); *F01N 2240/04* (2013.01); *F01N 2330/32* (2013.01); *F01N 2330/38* (2013.01); *F01N 2330/42* (2013.01)

(56) References Cited

U.S. PATENT DOCUMENTS

| | | | |
|---|---|---|---|
| 4,939,466 A | | 7/1990 | Johnson et al. |
| 5,177,961 A | | 1/1993 | Whittenberger |
| 5,263,317 A | | 11/1993 | Watanabe et al. |
| 5,670,746 A | | 9/1997 | Hashimoto et al. |
| 6,025,578 A | | 2/2000 | Brueck et al. |
| 6,660,061 B2 | * | 12/2003 | Josephson et al. ......... 95/2 |
| 6,712,884 B2 | | 3/2004 | Brück et al. |
| 6,938,409 B2 | | 9/2005 | Birckigt et al. |
| 7,261,865 B2 | * | 8/2007 | Bruck ................ 422/180 |
| 7,500,356 B2 | | 3/2009 | Hirata et al. |
| 7,959,868 B2 | | 6/2011 | Sarai et al. |
| 8,066,787 B2 | | 11/2011 | Althöfer |
| 8,066,952 B2 | | 11/2011 | Hodgson et al. |
| 2007/0006556 A1 | | 1/2007 | Brück et al. |
| 2007/0220870 A1 | | 9/2007 | Gonze et al. |
| 2008/0155967 A1 | | 7/2008 | Maus et al. |
| 2008/0229931 A1 | | 9/2008 | Katsuyama et al. |
| 2011/0258995 A1 | * | 10/2011 | Limbeck et al. ......... 60/320 |

FOREIGN PATENT DOCUMENTS

| | | |
|---|---|---|
| DE | 41 14 935 A1 | 11/1991 |
| DE | 195 33 088 A1 | 3/1997 |
| DE | 10130163 A1 | 1/2003 |
| DE | 102006000156 A1 | 11/2006 |
| DE | 102007000327 A1 | 12/2007 |
| EP | 1961929 A1 | 8/2008 |
| JP | H0536375 A | 2/1993 |
| JP | H06159035 A | 6/1994 |
| WO | 0180978 A1 | 11/2001 |
| WO | 0200326 A2 | 1/2002 |
| WO | 2005066469 A1 | 7/2005 |
| WO | 2005073529 A1 | 8/2005 |
| WO | 2005099867 A1 | 10/2005 |
| WO | 2006136431 A1 | 12/2006 |
| WO | 2007140932 A1 | 12/2007 |
| WO | 2009074402 A1 | 6/2009 |
| WO | WO 2010057578 A2 * | 5/2010 |

* cited by examiner

CONFIGURATION FOR A POWER SUPPLY OF A COMPONENT IN AN EXHAUST GAS SYSTEM

CROSS-REFERENCE TO RELATED APPLICATION

This application is a continuation, under 35 U.S.C. § 120, of copending International Application No. PCT/EP2011/065903, filed Sep. 14, 2011, which designated the United States; this application also claims the priority, under 35U.S.C. § 119, of German Patent Application DE 10 2010 045 507.5, filed Sep. 15, 2010; the prior applications are herewith incorporated by reference in their entirety.

BACKGROUND OF THE INVENTION

Field of The Invention:

The present invention relates to a configuration for a power supply of a component in an exhaust gas system, wherein in particular a power supply for an electrode for producing an electrical field in the exhaust gas system is specified.

A multiplicity of different concepts for eliminating soot particles from exhaust gases in mobile internal combustion engines, have already been discussed. In addition to wall flow filters which are closed on alternate sides, open secondary flow filters and gravity precipitators, etc., systems have also already been proposed in which the particles in the exhaust gas are electrically charged and then precipitated using electrostatic attraction forces. Those systems are known, in particular, by the designation "electrostatic filter" or "electric filter."

For such electric filters, (a plurality of) discharge electrodes and collector electrodes positioned in the exhaust gas line are generally proposed. In that context, for example, a central discharge electrode which runs approximately centrally through the exhaust gas line and a surrounding lateral surface of the exhaust gas line as a collector electrode, are used to form a capacitor. With that configuration of the discharge electrode and of the collector electrode, an electrical field is formed transversely with respect to the direction of flow of the exhaust gas, wherein the discharge electrode can be operated, for example, with a high voltage which is in the region of approximately 15 kV. As a result, in particular, corona discharges can form by which the particles flowing with the exhaust gas through the electrical field are charged in a unipolar fashion. Due to that charge, the particles migrate to the collector electrode as a result of the electrostatic Coulomb forces.

In addition to systems in which the exhaust gas line is embodied as a collector electrode, systems are also known in which the collector electrode is embodied, for example, as a wire mesh. In that context, the accumulation of particles on the wire mesh serves the purpose, under certain circumstances, of combining the particles with further particles in order to thereby achieve an agglomeration. The exhaust gas which flows through the mesh then carries the relatively large particle agglomerates along with it and feeds them to classic filter systems.

Even if the systems described above have heretofore proven suitable, at least in trials, for the treatment of soot particles, the implementation of that concept for series operation in motor vehicles still constitutes a large technical challenge. That applies, in particular, with respect to the greatly fluctuating soot load, which is very high at times, in the exhaust gas. Likewise, the desired retrofitability of such a system for use in exhaust gas systems which exist at present still constitutes a large problem. In particular, quantities of exhaust gas which generally increase suddenly occur in the exhaust gas system of motor vehicles, and do not occur, for example, in stationary internal combustion engines which are used to generate electrical power. Furthermore, the exhaust gas systems are subject to mechanical loading, for example due to unevennesses of the ground. In addition, it is necessary to bear in mind the fact that in view of the increased power and/or effectiveness of such exhaust gas systems it is also necessary to regenerate the filter systems (periodically and/or continuously) in order to eliminate soot particles, with the regeneration involving the conversion of the soot into gaseous components.

When filter systems are regenerated, it is also known not only to perform intermittent regeneration by brief heating, that is to say burning the soot (catalytically motivated, oxidative conversion), but also to convert the soot by nitrogen dioxide ($NO_2$). The advantage of the continuous regeneration with nitrogen dioxide is that the soot can then already be converted at significantly lower temperatures (in particular less than 250° C.). For that reason, continuous regeneration is preferred in many application cases. However, that leads to the problem that it is necessary to ensure that the nitrogen dioxide in the exhaust gas comes into contact with the accumulated soot particles to a sufficient extent.

In that context as well, technical difficulties arise in the implementation of continuous operation of such exhaust gas systems in motor vehicles, wherein the different loading of the internal combustion engines gives rise to different exhaust gas flows, compositions of exhaust gas and/or temperatures.

Furthermore, it is to be borne in mind that when such components are made available for such a soot precipitation system, simple components are to be used as far as possible, in particular components which can be manufactured cost-effectively as part of series production as well. Furthermore, particularly with respect to the construction of the electrodes, it is necessary to bear in mind that under certain circumstances they have to be positioned so as to be aligned in the exhaust gas line, in particular in such a way that an undesirably high ram pressure or undesired eddying of the exhaust gas does not occur in the region of the electrode.

When such an electrical field is formed, it is also necessary to ensure that the voltages and currents which are necessary therefor are reliably made available on a continuous basis and, in particular, danger to the surroundings or to persons is precluded. In that context it is necessary to bear in mind that to a certain extent voltages in the range of 1 to 30 kV are to be implemented, wherein the currents are generally relatively low, for example less than 0.1 ampere.

SUMMARY OF THE INVENTION

It is accordingly an object of the invention to provide a configuration for a power supply of a component in an exhaust gas system, which overcomes the hereinafore-mentioned disadvantages and at least partially solves the highlighted problems of the heretofore-known configurations of this general type. In particular, a configuration is to be proposed for a power supply in which reliable operation of the exhaust gas system is continuously made possible. In addition, the device for forming electrical contact and/or the electric conductor are also to be configured, where possible, in particular, in a simple way in order to promote provision thereof as part of series production.

With the foregoing and other objects in view there is provided, in accordance with the invention, a configuration for a power supply of a component in an exhaust gas system. The configuration comprises at least one electrical contact on an exhaust gas line, in which at least the electrical contact is surrounded by an electrical insulation material.

The component which is made available in this case in the exhaust gas system is preferably an electrode for forming an electrical field in the exhaust gas line. Of course, the power supply can also be used to make electrical contact with a plurality of components (if appropriate different components) in the exhaust gas system.

This requires that electrical contact be implemented from the power supply to the at least one component in the exhaust gas system. In the process, the electrical contact generally also penetrates the exhaust gas line, at least partially. In this context, an electrical contact constitutes, in particular, a type of electrical plug and/or an electrical feedthrough through the exhaust gas line. The electrical contact is suitable, in particular, for implementing voltages above 1 kV (kilovolt), in particular in the range from 2 kV to 50 kV, wherein small currents, for example less than 1 ampere or even less than 0.1 ampere, are generally present. The electrical contact can accordingly be provided on or at an external wall of the exhaust gas line. Of course, it is also possible for a plurality of such electrical contacts to be provided.

In addition there is provision for the electrical contact to be surrounded at least partially by electrical insulation material. That is to say in other words, in particular, that the electrical contact is led through the electrical insulation material. In particular, this also has the effect that, for example, connections for the power supply in the case of the electrical contact are spaced apart from other (metallic) areas of the exhaust gas line by the electrical insulation material. An electrical insulation material which is correspondingly puncture proof for the applied voltage is preferably used for this purpose.

With respect to the connection between the power supply and the electrical contact, there is, in particular, provision for the conductor in this case to be an electrical conductor which has an electrical positive shield. For this purpose, in particular, a coaxial cable may be provided, especially with a Protection Class IP 68.

In accordance with another feature of the configuration of the invention, the at least one electrical contact is cast in electrical insulation material. In this case, in particular, provision is made for the electrical contact itself to form a plug which is, for example, in electrical contact with the exhaust gas line. Furthermore, it is also possible for an electrical feedthrough to be part of the electrical contact and also substantially cast in the electrical insulation material. For this purpose, the electrical contact can, for example, be positioned on the exhaust gas line and then surrounded with a layer of the electrical insulation material, which then cures. This provides a particularly simple way of manufacturing such an insulated electrical contact.

In accordance with a further feature of the invention, the exhaust gas line is at least partially surrounded with an electrical insulation material on an external wall. This means, in particular, that a partial section, in particular an outer insulation layer or insulation coating surrounding the outer wall adjacent the electrical field in the interior of the exhaust gas system, is provided. There is provision in this case, for example, that an annular section is provided on the external wall of the exhaust gas line with a coating, wherein electrical insulation material is positioned there, for example by a flame spraying method.

The insulation material is preferably embodied in such a way that even after an accident involving a passenger car, no components to which high voltages are applied are exposed and/or that such components cannot enter into contact with other components in the case of an accident. This may, in particular, start from the location to be insulated through a suitable selection of material, of a suitable thickness of the insulation material and/or of suitable spreading of the insulation material going beyond the location to be insulated.

In addition it is preferred that the insulation material is temperature-resistant. This means that the insulation material does not significantly change its insulating and/or mechanical properties even at temperatures above 500° C. [degrees Celsius] or even above 900° C.

In accordance with an added feature of the configuration of the invention, at least one electrical contact forms a feedthrough through the exhaust gas line and includes at least one electrode. In this case, for example, an opening is formed in the exhaust gas line through which or with which the feedthrough is implemented. The feedthrough may, in particular, be part of the electrical contact or of the plug. The feedthrough is preferably also formed with electrical insulation material and in the process is embodied, in particular, to be so dimensionally rigid that the feedthrough can serve at the same time as a type of mount for the electrodes. If appropriate, connecting elements for conduction of current from the power supply to the (separate) electrode can also be provided in this case. Basically, it is possible for every electrical contact in the configuration to have a feedthrough, but this is not necessarily the case. In particular, an electrical contact can also be embodied with a plurality of feedthroughs. In particular, a highly dense ceramic is preferred as insulation material in this case, wherein the thickness of the ceramic layer is selected in such a way that a puncture in the case of voltages up to 40 kV is effectively prevented.

In accordance with an additional feature of the configuration of the invention, particularly in this context, the feedthrough is formed with a ceramic tube. The ceramic itself constitutes an electrical insulation material, wherein the tube shape is particularly suitable for accommodating an electrode in the interior. It is likewise possible without problems to secure and/or attach the electrode permanently in the ceramic tube.

In one development of the invention, the configuration according to the invention is implemented by an electric contact which is guided in a tube and is surrounded by an insulation material, wherein the insulation material is connected in a water-impermeable manner with its entire circumference, at least at one location, to an inner surface of the tube. Such a water-impermeable connection may be implemented, for example, by bonding or crimping. The tube itself is therefore connected to the exhaust gas line in such a way that the electrical contact is guided through the exhaust gas line.

In accordance with a concomitant advantageous feature of the configuration of the invention, at least one electrode and one particle precipitator are provided in the exhaust gas line, wherein an electrical field can be generated between the at least one electrode and the particle precipitator.

It is quite particularly preferred in this case that the particle trap which is disposed (directly) downstream in this case serves as a type of collector electrode. As a result, the soot particles which flow through the region between the at least one electrode and the particle trap are charged in the electrical field positioned there and finally deflected to the filter material of the particle trap. In this context, it is, of course, also simultaneously possible for agglomeration to take place. The particle trap is, in particular, a so-called open secondary flow filter in which there are no completely closed flow channels present. The particle trap is instead shaped with a metallic nonwoven and metallic corrugated layers in which openings, guiding structures, etc. are provided. The guiding structures in this case form flow constrictions in the flow passages with the result that the dwell time or impact probability for soot particles in the interior of the particle trap is increased. In this context, reference is made to the known patent publications of the Applicant of the instant application, which can be used for more detailed characterization of the particle trap and/or the regeneration thereof. In particular, incorporation by reference is made herein of the full extent of the description of the following documents:

International Publication No. WO 01/80978, corresponding to U.S. Pat. No. 8,066,952;
International Publication No. WO 02/00326, corresponding to U.S. Pat. No. 6,712,884;
International Publication No. WO 2005/099867, corresponding to U.S. Pat. No. 7,959,868;
International Publication No. WO 2005/066469, corresponding to U.S. Patent Application Publication No. 2007/006556;
International Publication No. WO 2006/136431, corresponding to U.S. Patent Application Publication No. 2008/155967, and
International Publication No. WO 2007/140932, corresponding to U.S. Pat. No. 8,066,787.

The regeneration of such a particle trap preferably continuously occurs in this case on the basis of the CRT method. For this purpose, for example, an oxidation catalytic converter, in which nitrogen monoxide is (also) oxidized to nitrogen dioxide, and then reacts with the soot in the particle trap, can be connected upstream of the device. In addition it is also possible that such an oxidatively acting coating is implemented in the particle trap itself, either in a zone thereof or else in all the regions of the particle trap.

Other features which are considered as characteristic for the invention are set forth in the appended claims, noting that the features specified individually in the claims can be combined with one another in any desired technically appropriate way, and disclose further refinements of the invention.

Although the invention is illustrated and described herein as embodied in a configuration for a power supply of a component in an exhaust gas system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
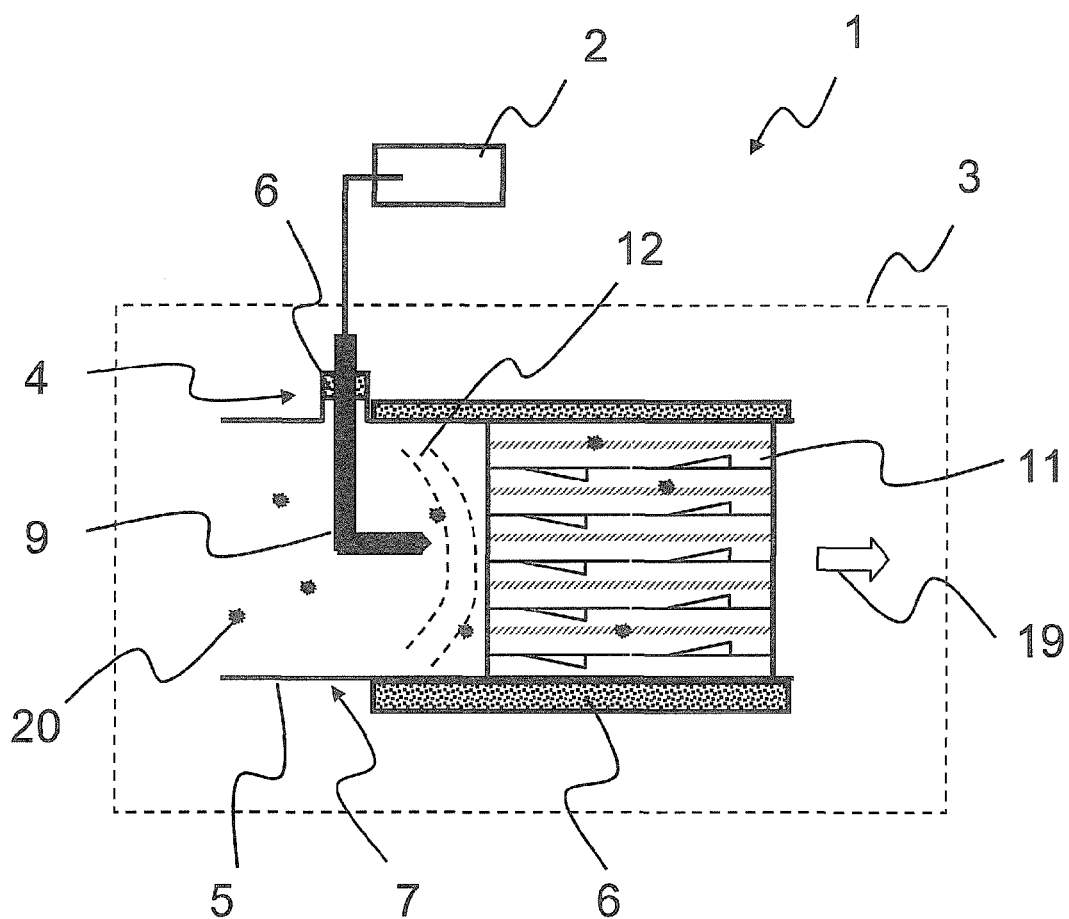
FIG. 1 is a diagrammatic, longitudinal-sectional view of a first embodiment variant of a configuration for a power supply of a component in an exhaust gas system.

Referring now to the figures of the drawings in detail and first, particularly, to FIG. 1 thereof, there is seen a configuration 1 for a power supply 2 of a component in an exhaust gas system 3. An exhaust gas line 5 is diagrammatically illustrated in a longitudinal section in the center of the figure as well as a flow direction 19 of an exhaust gas flowing through the exhaust gas line 5. In this case, the exhaust gas contains particles 20, in particular soot, which are to be removed from the exhaust gas with a particle precipitator 11 (referred to as an open secondary flow filter).

In addition, the configuration 1 has a centrally disposed electrode 9. The electrode 9 serves to generate an electrical field 12 between the electrode 9 and the particle precipitator 11.

The electrode 9 is electrically connected to the power supply 2 so that a necessary current flow for the generation of the electrical field 12 can then be made available. This may take place outside the exhaust gas line 5, for example by using a coaxial cable which is guided to an electrical contact 4. When an external wall at the exhaust gas line 5 is penetrated, an electrical insulation material 6 provided there prevents a sparkover to adjacent regions of the exhaust gas line 5. For this purpose, on one hand the electrical contact 4 is surrounded by an electrical insulation material 6 and on the other hand an external wall 7 is also formed adjacent the electrical contact 4 around the electrical field 12 and the particle precipitator 11.

Figure 2:
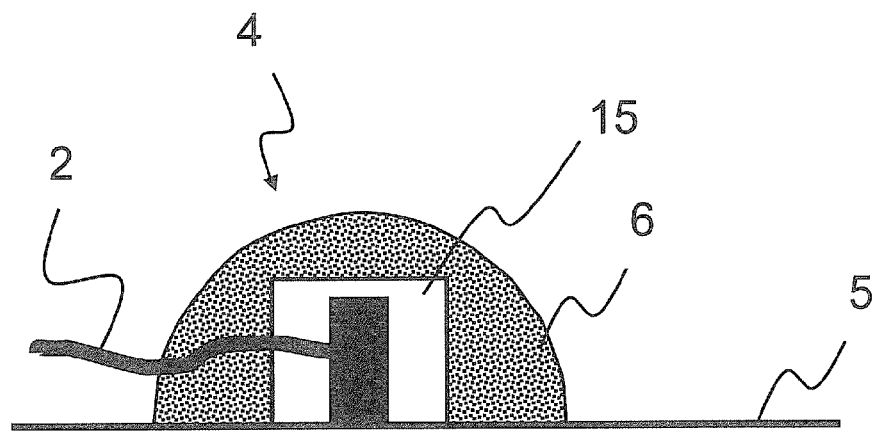
FIG. 2 is an enlarged, cross-sectional view showing details of an embodiment variant of the configuration.

FIG. 2 shows details of a plug structure for an electrical contact 4. In this case, the power supply 2, which is embodied as a coaxial cable, ends in a plug 15 which is positioned on the exhaust gas line 5. The entire plug 15 is surrounded in this case by electrical insulation material 6. The plug 15 is cast, in particular, in the electrical insulation material 6 which sticks to the exhaust gas line 5.

Figure 3:
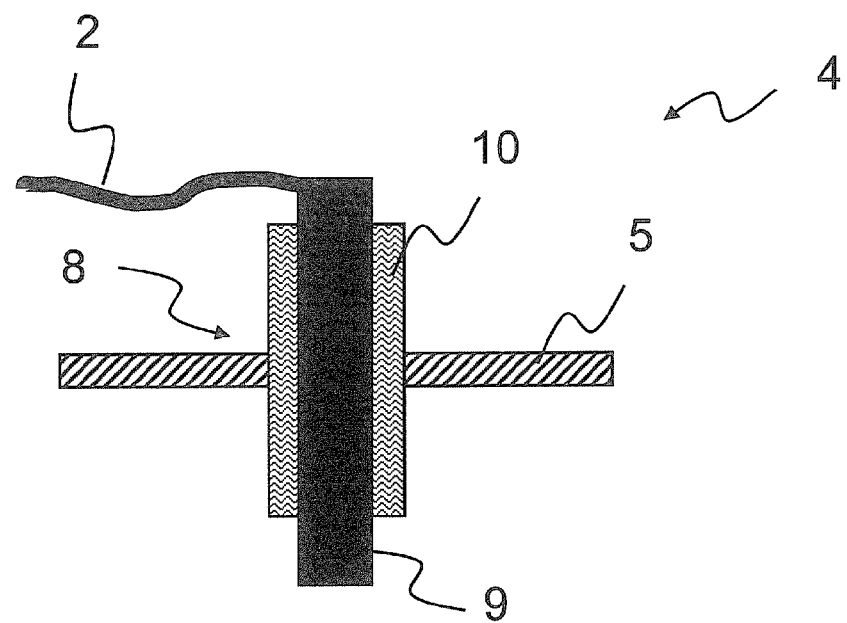
FIG. 3 is a cross-sectional view showing details of another embodiment variant of the configuration.

FIG. 3 shows another embodiment variant of an electrical contact 4 in the manner of a feedthrough 8. In this case, the power supply 2 or the electrode 9 respectively penetrate the exhaust gas line 5. In order to provide an insulated feedthrough, a ceramic tube 10 is also provided which penetrates the exhaust gas line 5 and therefore reliably leads through the respective power supply 2 or the electrode 9 in an electrically insulated fashion.

Figure 4:
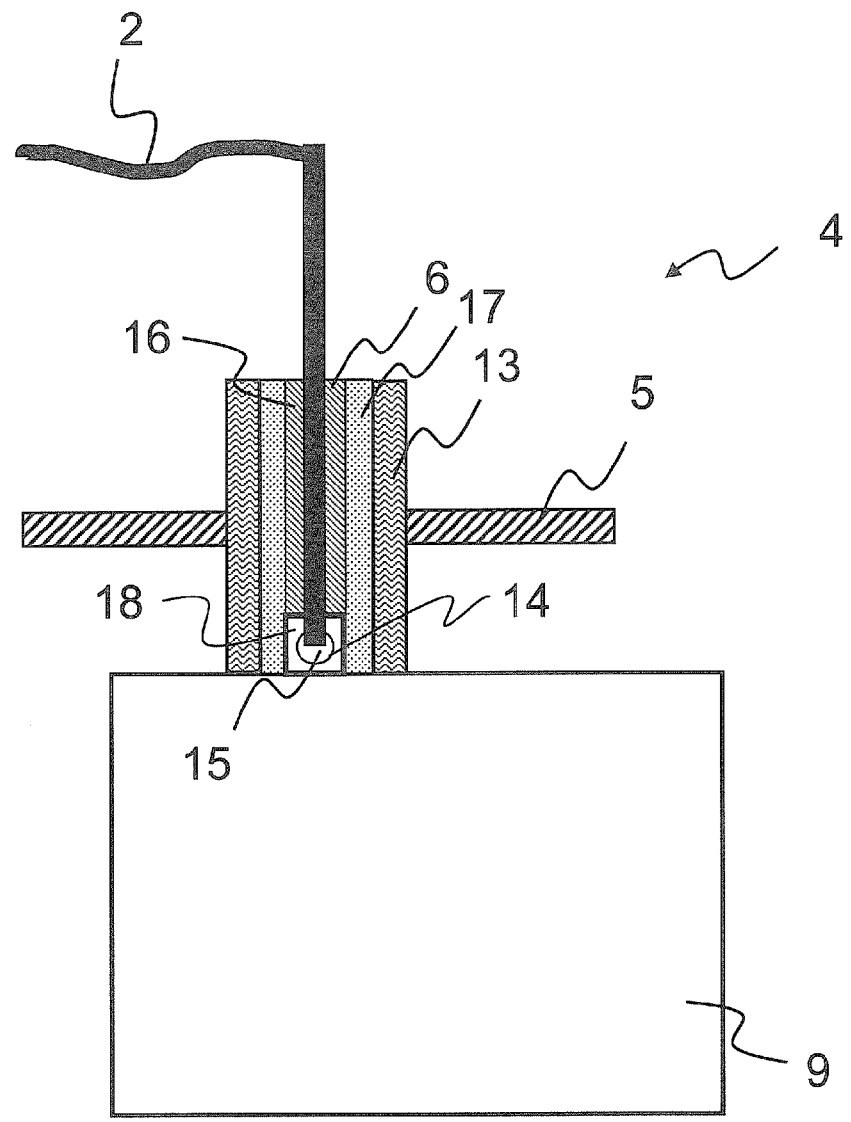
FIG. 4 is a cross-sectional view showing details of a further embodiment variant of the configuration.

FIG. 4 also shows a further embodiment variant of an electrical contact 4 in which a tube 13 is mounted in the exhaust gas line 5. The power supply 2 is surrounded in the tube 13 by an electrical insulation material 6 as a protective layer 16. The protective layer 16 is in turn attached in a water-impermeable fashion in the tube 13 by an adhesive 17. An electrode 9 is placed in contact with a current distributor 18 through a connection 14 and a plug 15.

The invention therefore at least partially solves the problems described in relation to the prior art. In particular, a configuration for a power supply in which reliable operation of the exhaust gas system is continuously made possible is proposed. In addition, the manner of making electrical contact and/or the electrical conductor have a simple construction in order, in particular, to favor the provision as part of series production.

The invention claimed is:

1. A configuration for a power supply of a component in an exhaust gas system having an exhaust gas line, the configuration comprising:
   at least one electrical contact disposed at the exhaust gas line, said at least one electrical contact including at least one electrode, and said at least one electrical contact extending through the exhaust gas line and forming a feedthrough; and
   a ceramic electrical insulation surrounding at least said electrical contact and said feedthrough, said ceramic electrical insulation being dimensioned and configured for being puncture proof at voltages on said feedthrough above 1 kV;
   said at least one electrical contact and said feedthrough being cast in said electrical insulation and said electrical contact being led through said electrical insulation;
   a particle precipitator disposed in the exhaust gas line, said at least one electrode generating an electrical field between said at least one electrode and said particle precipitator.

2. The configuration according to claim 1, wherein said electrical insulation at least partially surrounds an external wall of the exhaust gas line.

3. The configuration according to claim 1, wherein said feedthrough is formed with a ceramic tube.

4. The configuration according to claim 1, wherein said at least one electrode is disposed inside the exhaust gas line upstream of said particle precipitator with respect to a flow direction of exhaust gas through the exhaust gas line.

5. The configuration according to claim 1, wherein said ceramic electrical insulation is dimensioned and configured to be puncture proof at voltages on said feedthrough in a range of 2 kV to 50 kV.

6. The configuration according to claim 1, wherein said electrical insulation defines an annular section around an external wall of the exhaust gas line adjacent the electric field.

* * * * *